(12) United States Patent
Nio (10) Patent No.: US 7,733,582 B2
(45) Date of Patent: Jun. 8, 2010

(54) IMAGING LENS

(75) Inventor: Junichi Nio, Chiba (JP)

(73) Assignee: Seiko Precision Inc. (JP)

( * ) Notice: Subject to any disclaimer, the term of this patent is extended or adjusted under 35 U.S.C. 154(b) by 216 days.

(21) Appl. No.: 12/109,314

(22) Filed: Apr. 24, 2008

(65) Prior Publication Data

US 2008/0285153 A1    Nov. 20, 2008

(30) Foreign Application Priority Data

Apr. 27, 2007    (JP)    ............... 2007-118436

(51) Int. Cl.
G02B 9/12    (2006.01)
G02B 13/18    (2006.01)

(52) U.S. Cl. ...................... 359/784; 359/716

(58) Field of Classification Search ......... 359/784–785, 359/791–792, 716
See application file for complete search history.

(56) References Cited

U.S. PATENT DOCUMENTS 7,468,847 B2 * 12/2008 Tang ........................... 359/785
7,602,560 B2 * 10/2009 Kawasaki ..................... 359/785
2004/0179274 A1 * 9/2004 Amanai ........................ 359/785

* cited by examiner

Primary Examiner—Jordan M. Schwartz
(74) Attorney, Agent, or Firm—Townsend and Townsend and Crew LLP (57) ABSTRACT

An imaging lens enables a large focal depth and low error sensitivity. The imaging lens satisfies "$0.016 < \Delta/f < 0.018$," where $\Delta$ is the absolute value of longitudinal chromatic aberrations at F curve and C curve wavelengths, and f is the combined focal distance of the entire compound imaging lens. A first, a second, and a third lens are disposed sequentially, the first lens disposed toward an object, and the third lens disposed toward an image surface. The first lens has a positive refraction, a meniscus shape, and a convex surface facing the object. The second lens has a meniscus shape with a concave surface facing the object. The third lens has a convex-type shape facing the object; and a concave-type aspherical shape facing the image surface, providing a negative refraction in a radially central portion and a positive refraction in a radially peripheral portion.

2 Claims, 11 Drawing Sheets

FIG.8A
FIELD CURVATURE

FIG.8B
DISTORTION

FIG.8C
PUPIL RADIUS : 0.4382 MILLIMETER

FIELD CURVATURE

FIG.9B

DISTORTION

FIG.9C

PUPIL RADIUS : 0.5218 MILLIMETER

FIG.9D

FIG.10A
FIELD CURVATURE

-0.10   0.00   0.10
MILLIMETERS

FIG.10B
DISTORTION

-5.00   0.00   5.00
PERCENT

FIG.10C
PUPIL RADIUS : 0.5386 MILLIMETER

-0.10   0.00   0.10
MILLIMETERS

IMAGING LENS

BACKGROUND OF THE INVENTION

1. Field of the Invention

The present invention relates to a compound imaging lens including three lens elements.

2. Description of the Related Art

In recent years, the advancement of miniature solid-state image sensors for mobile cameras mounted in applications such as mobile phones has resulted in the use of solid-state image sensors having pixels 3 μm or smaller in size. An imaging lens having three or more lens elements is necessary to practically accommodate solid-state image sensors of such extremely small pixel sizes. Such optical systems require corrections to sufficiently compensate for various aberrations.

Unexamined Japanese Patent Application KOKAI Publication No. 2006-308789 discusses a known example of an imaging device using three lens elements.

However, the imaging lens discussed in the Unexamined Japanese Patent Application KOKAI Publication recited above has a small depth of focus, causing difficulties when focusing. Moreover, such an optical system is highly sensitive to errors.

The present invention was accomplished in consideration of the problems recited above, and is directed to provide a compound imaging lens that has three lens elements, a compact size, a large depth of focus, and low sensitivity to error.

SUMMARY OF THE INVENTION

To accomplish the objects recited above, a compound imaging lens of the present invention includes:

a first lens, a second lens, and a third lens disposed sequentially in this order, the first lens disposed toward an object, and the third lens disposed toward an image surface; wherein the first lens has a meniscus shape, a positive refraction, and a convex surface, the convex surface facing the object;

the second lens has a meniscus shape and a concave surface, the concave surface facing the object;

the third lens has a convex-type surface facing the object, and a concave-type aspherical surface facing the image surface, the concave-type aspherical surface configured to provide a negative refraction in a radially central portion and a positive refraction in a radially peripheral portion; and a condition $$0.016 < \Delta/f < 0.018 \tag{1}$$

is satisfied, where

Δ is defined as an absolute value of longitudinal chromatic aberrations at Fraunhofer F curve and C curve wavelengths, and f is defined as a combined focal distance of the entire compound imaging lens.

(Hereinafter for brevity, "Fraunhofer line wavelength A" may be referred to as "line," e.g., "Fraunhofer C curve wavelength" may be referred to as "C curve," etc.)

The present invention may include, for example, an aperture stop disposed between the first lens and the second lens.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Four particular exemplary embodiments are presented to illustrate possible implementations of the present invention.

FIG. 1 through FIG. 4 illustrate configurations of imaging lenses CL1 through CL4 according to a first through a fourth exemplary embodiment, respectively, of the present invention. The imaging lenses CL1 through CL4 have similar fundamental configurations and design conditions, and differ only by shape. Hereinafter follows a description of the basic configuration and design conditions common to the imaging lenses CL1 through CL4, after which follows a description of the shapes and properties of each individual imaging lens CL1 through CL4.

[Basic Configuration]

The imaging lenses CL1 through CL4 each include three lens elements as illustrated in FIG. 1 through FIG. 4. For convenience, the lens elements are referred to hereinafter as the first lens L1, the second lens L2, and the third lens L3. The first lens L1 is disposed closest to the object to be imaged (not illustrated; hereinafter referred to as "the object"), and the third lens L3 is disposed farthest from the object.

The first lens L1 is a positive meniscus lens, arranged with a convex surface facing the object. The second lens L2 is a positive meniscus lens, arranged with a concave surface facing the object. The third lens L3 has a convex-type surface facing the object and a concave-type aspherical surface facing the image surface. The concave-type aspherical surface is configured to provide a negative refraction in a radially central portion and a positive refraction in a radially peripheral portion.

An aperture stop S is disposed between the first lens L1 and the second lens L2. A parallel flat plate glass G is disposed between the third lens L3 and the image surface B. The parallel flat plate glass G corresponds to a filter and a cover glass.

[Design Conditions]

The imaging lenses CL1 through CL4 presented in Table 1 are designed to satisfy the condition (1) recited below.

TABLE 1

|  | f | Δ | Δ/f |
|---|---|---|---|
| CL1 (embodiment 1) | 3.715 | 0.062 | 0.0167 |
| CL2 (embodiment 2) | 3.067 | 0.053 | 0.0172 |
| CL3 (embodiment 3) | 2.922 | 0.049 | 0.0168 |
| CL4 (embodiment 4) | 3.016 | 0.052 | 0.0172 |

The condition for lens design is $$0.016 < \Delta/f < 0.018 \quad (1)$$

where $\Delta$ is the absolute value of longitudinal chromatic aberrations at the F curve and the C curve, and f is the combined focal distance of the entire lens system.

The following is a description of the basis for the condition (1). A modulation transfer function (MTF) is an indicator for evaluating the ability of a lens to form an image. The MTF expresses how closely the lens reproduces the contrast of the object to be imaged. In other words, a higher MTF indicates better image quality.

The depth of focus of the lens is another index, expressed as a defocus range wherein a predetermined MTF value is obtained.

Generally for optical systems in applications such as mobile cameras, a peak value of the MTF, or MTF peak, of less than 45% indicates unacceptable image quality. Moreover, a defocus range defined by the area of the curve where MTF values are 20% or more should equal or exceed 90 μm, and conversely indicates poor operability, i.e., focusing difficulties, when less than 90 μm. For these reasons, it is necessary to satisfy the following conditions:

$$\text{MTF peak} \geq 45\% \quad (2)$$

and $$\text{defocus range(where } \textit{MTF} \text{ values} \geq 20\%) \geq 90 \text{ μm} \quad (3)$$

Figure 1:
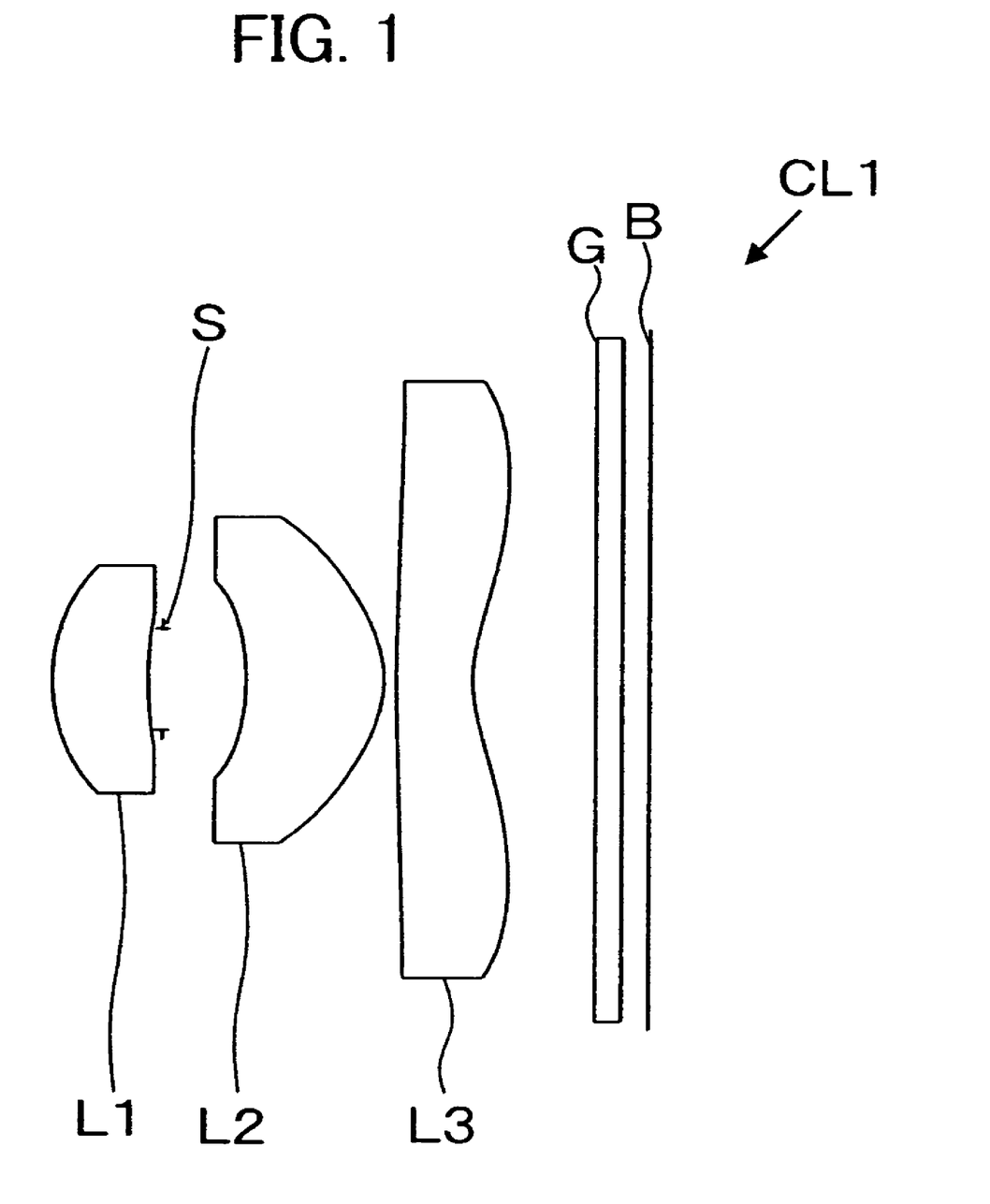
FIG. 1 illustrates a lens configuration of an imaging lens according to a first exemplary embodiment.
Figure 2:
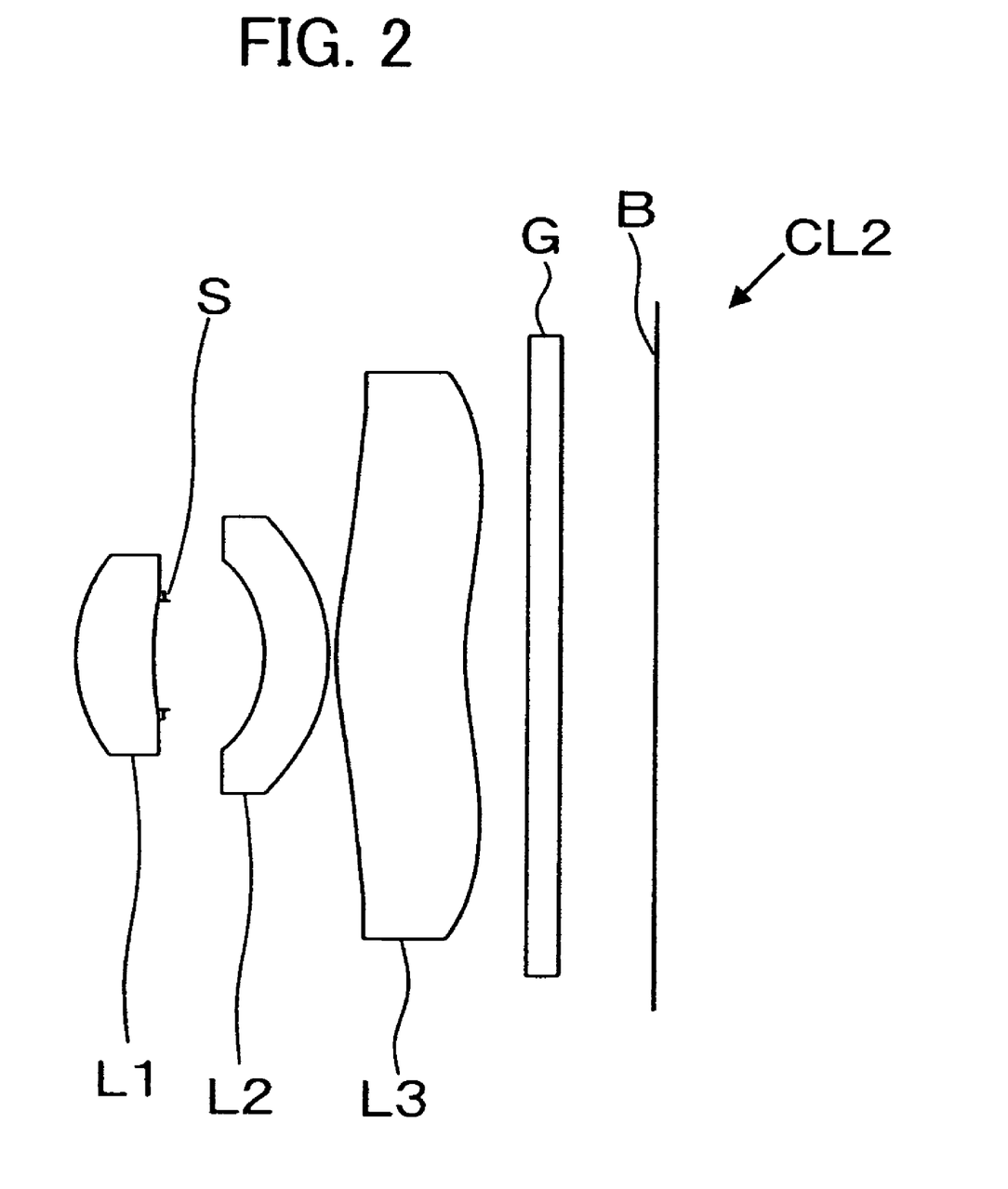
FIG. 2 illustrates a lens configuration of an imaging lens according to a second exemplary embodiment.
Figure 3:
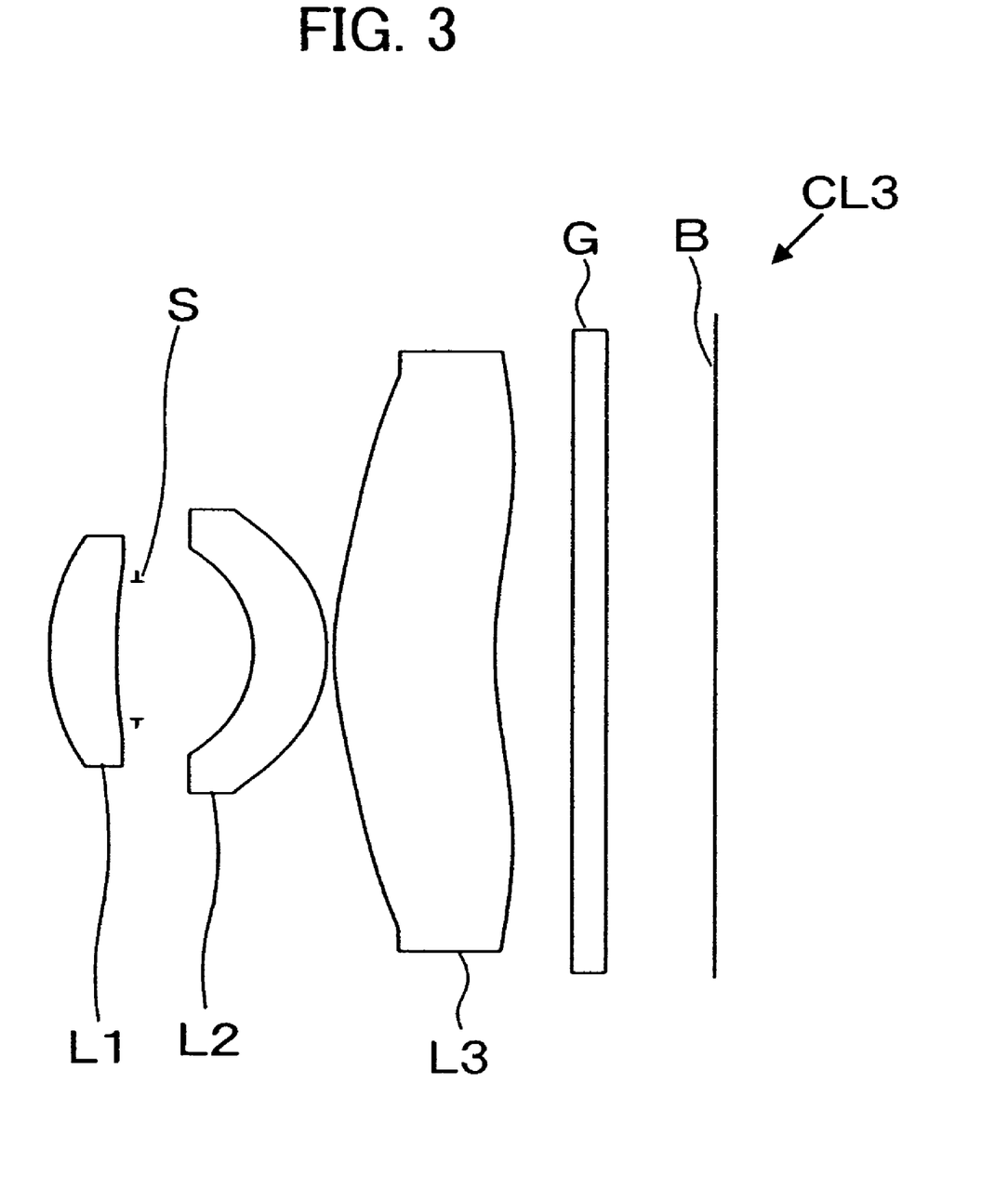
FIG. 3 illustrates a lens configuration of an imaging lens according to a third exemplary embodiment.
Figure 4:
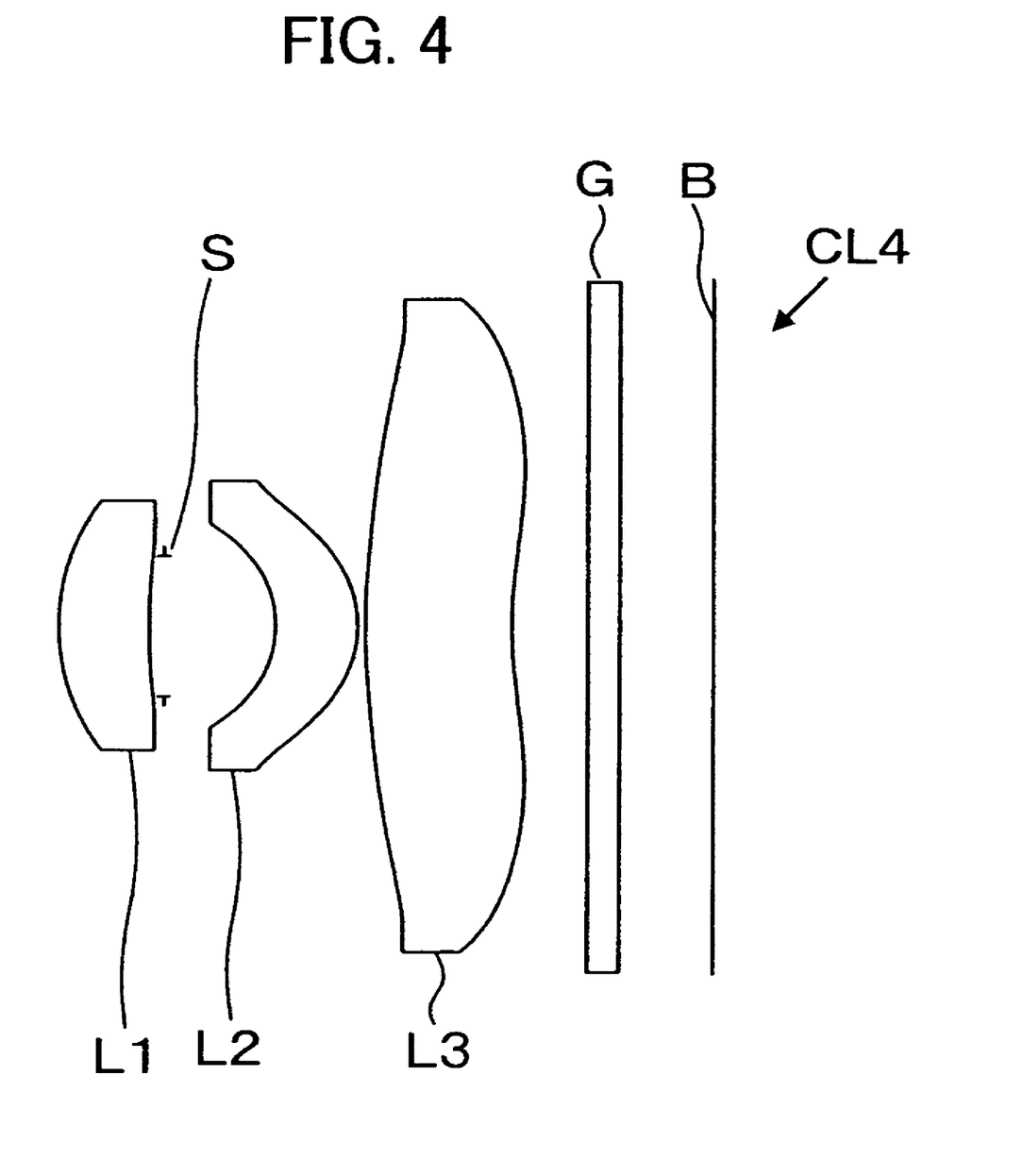
FIG. 4 illustrates a lens configuration of an imaging lens according to a fourth exemplary embodiment.
Figure 5:
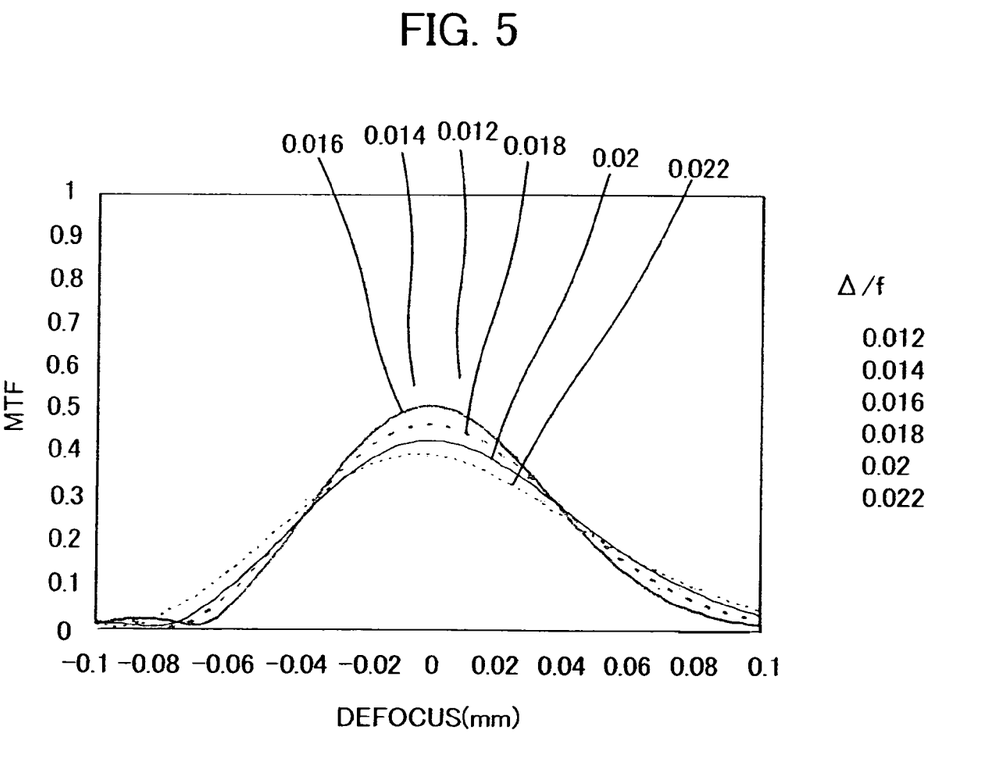
FIG. 5 illustrates defocus-MTF curves for various values of Δ/f.

The magnitude of Δ/f causes variation in both the MTF peak and the shape of the defocus-MTF curve, i.e., the curve illustrating the change in MTF as a function of a change in defocus. FIG. 5 illustrates defocus-MTF curves for Δ/f values varying in the range of 0.012 to 0.022.

Δ/f values of 0.020 and 0.022 result in MTF peaks that do not satisfy condition (2), indicating that sufficient image quality cannot be obtained, as illustrated in FIG. 5. Furthermore, Δ/f values of 0.012 and 0.014 result in good images, but condition (3) is not satisfied, and therefore the depth of focus is small and the operability is poor. Conversely, Δ/f values between 0.016 and 0.018 satisfy both condition (2) and condition (3). In other words, Δ/f values between 0.016 and 0.018 enable sufficient image quality and operability for practical use.

First Exemplary Embodiment

The data defining lens elements of an imaging lens CL1 according to a first exemplary embodiment is presented in Table 2. In Table 2, "Curvature Radius r" is defined as the curvature radius of each lens surface; "Distance d" is defined as the distance from the No. i surface (lens surface or element surface) to the No. i+1 surface; "Refractive Index nd" is the refractive index of the material at the wavelength of the d curve; and "Abbe Number vd" is the Abbe Number with respect to the d curve.

TABLE 2

| No. | Curvature Radius r | Distance d | Refractive Index nd | Abbe Number vd | Descripton |
|---|---|---|---|---|---|
| 0 | 0 | Infinity |  |  |  |
| 1 | 1.447 | 0.766 | 1.53115 | 56 | first lens |
| 2 | 3.370 | 0.127 |  |  |  |
| 3 | 0 | 0.658 |  |  | aperture |
| 4 | −1.859 | 1.122 | 1.53115 | 56 | second lens |
| 5 | −0.891 | 0.100 |  |  |  |
| 6 | 7.400 | 0.615 | 1.53115 | 56 | third lens |
| 7 | 1.090 | 1.000 |  |  |  |
| 8 | 0 | 0.210 | 1.51680 | 64.2 | filter |
| 9 | 0 | 0.220 |  |  |  |

The numbers (No.) in Table 2 refer to lens surfaces or element surfaces, numbered in ascending order beginning nearest to the object. For example, No. 1 is the lens surface of the lens L1 toward the object, No. 3 is the surface of the aperture stop S, etc.

To further define the lens shapes, coordinate axes are defined such that the optical axis of the imaging lens CL1 is the z axis, and the axis perpendicular to and intersecting the optical axis is the y axis. In the formula below, c is defined as the reciprocal of the curvature radius; k is the conic constant; and $\alpha_4$, $\alpha_6$, $\alpha_8$, $\alpha_{10}$, $\alpha_{12}$, $\alpha_{14}$, and $\alpha_{16}$ are asphericity coefficients. Then, the aspherical shape of each lens surface is given by:

[Formula 1]

$$z = \frac{cy^2}{1 + \sqrt{1 - (1+k)c^2 y^2}} + \alpha_4 y^4 + \alpha_6 y^6 + \alpha_8 y^8 + \alpha_{10} y^{10} + \alpha_{12} y^{12} + \alpha_{14} y^{14} + \alpha_{16} y^{16} \quad (4)$$

The parameters defining the first through the third lenses L1 through L3 of the imaging lens CL1, i.e., the conic constant k and asphericity coefficients $\alpha_4$, $\alpha_6$, $\alpha_8$, $\alpha_{10}$, $\alpha_{12}$, $\alpha_{14}$, and $\alpha_{16}$, are listed in Table 3. The nomenclature of the numbers (No.) in Table 3 is the same as that of Table 2.

TABLE 3

| No. | k | α4 | α6 | α8 | α10 | α12 | α14 | α16 |
|---|---|---|---|---|---|---|---|---|
| 1 | 0.34736 | 4.93141E−03 | −4.49534E−02 | 1.52516E−01 | −1.95309E−01 | 1.01964E−01 | 0 | 0 |
| 2 | −26.40453 | 1.19076E−01 | 1.66750E−02 | 3.94594E−01 | −3.84338E+00 | 8.45384E+00 | 0 | 0 |
| 4 | −4.65615 | −1.85405E−01 | 3.52239E−01 | −1.31309E+00 | 1.68798E+00 | −1.00306E+00 | 0 | 0 |

TABLE 3-continued

| No. | k | α4 | α6 | α8 | α10 | α12 | α14 | α16 |
|---|---|---|---|---|---|---|---|---|
| 5 | −2.80271 | −9.40888E−02 | 5.66146E−02 | −1.07766E−02 | −2.39162E−02 | 8.85334E−03 | 0 | 0 |
| 6 | −1138.71919 | 0.00000E+00 | 0.00000E+00 | 0.00000E+00 | 0.00000E+00 | 0.00000E+00 | 0 | 0 |
| 7 | −8.27110 | −4.07006E−02 | 7.45291E−03 | −6.14090E−04 | −3.28573E−05 | 4.65277E−06 | 0 | 0 |

The F-number of the imaging lens CL1 is f/3.6, and the angle of view 2ω is 66.3°.

Figure 6A:
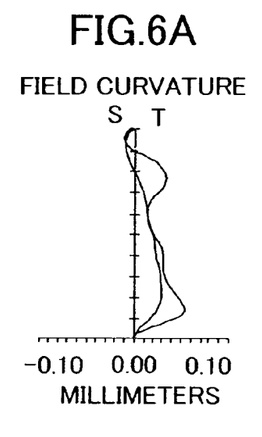
FIGS. 6A through 6D illustrate various aberrations of the imaging lens according to the first exemplary embodiment.
Figure 6B:
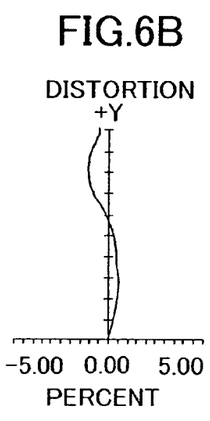
Figure 6C:
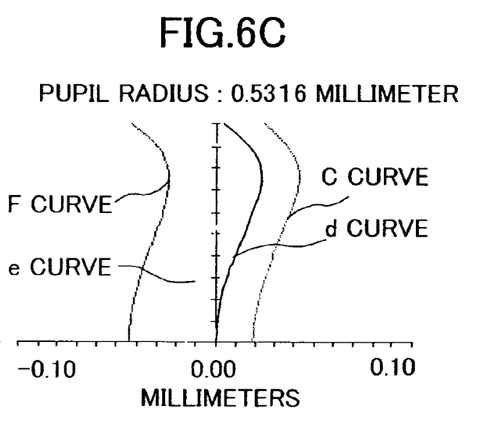
Figure 6D:
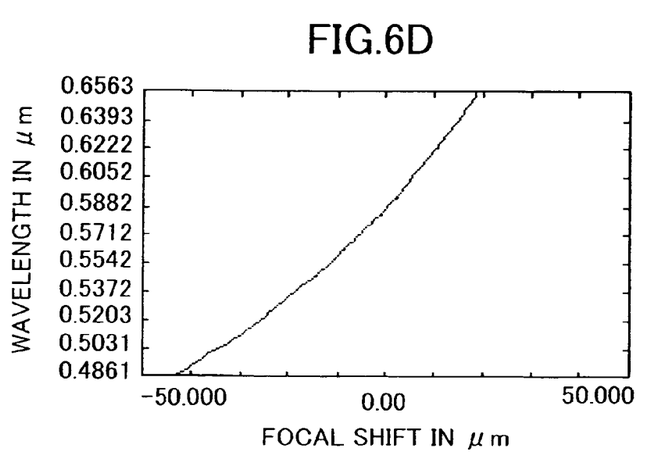

Aberrations of the imaging lens CL1 are illustrated in FIGS. 6A through 6D. FIG. 6A is a graph of astigmatism. FIG. 6B is a graph of distortion. FIG. 6C is a graph of spherical aberration. FIG. 6D is a graph of longitudinal chromatic aberration.

Figure 7A:
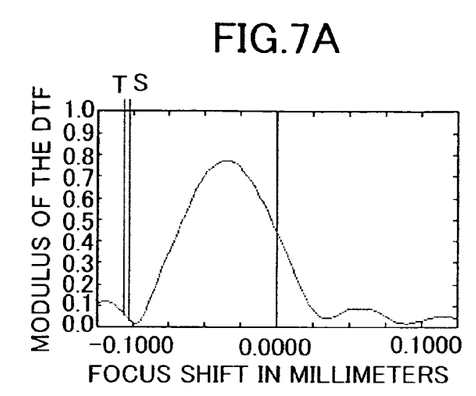
FIGS. 7A through 7D illustrate defocus-MTF curves for the imaging lens according to the first exemplary embodiment.
Figure 7B:
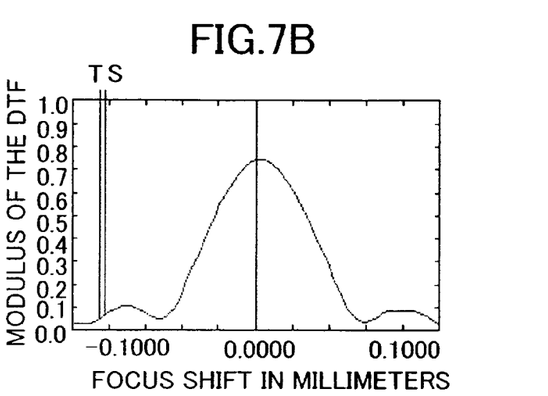
Figure 7C:
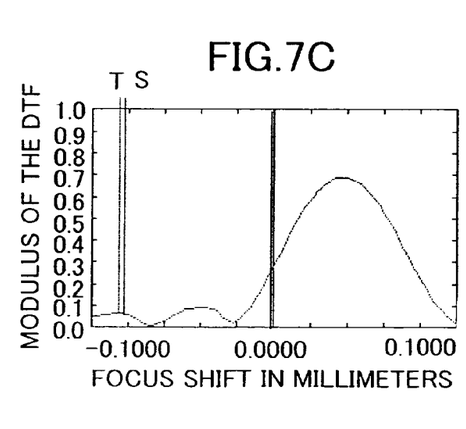
Figure 7D:
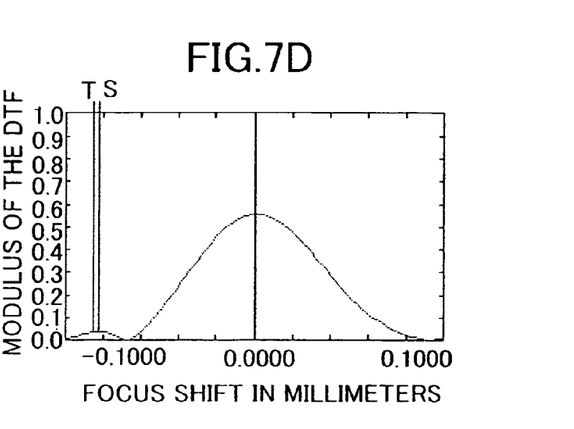

The defocus-MTF curves of the imaging lens CL1 illustrated in FIGS. 7A through 7D are for a spatial frequency of 100 lp/mm. FIGS. 7A through 7C are graphs for single wavelengths at the F curve, the e curve, and the C curve, respectively. FIG. 7D is a graph for multiple wavelengths (white light) having wavelength weights of F curve: e curve: C curve=1:2:1.

Comparing FIG. 7A and FIG. 7B, the MTF peak at the F curve is shifted about 30 μm in the minus direction from the MTF peak at the e curve. Comparing FIG. 7B and FIG. 7C, the MTF peak at the C curve is shifted about 40 μm in the positive direction from the MTF peak at the e curve. In other words, the defocus-MTF curves of the imaging lens CL1 indicate large shifts between peaks by wavelength, therefore indicating a large chromatic aberration.

TABLE 4

| No. | Curvature Radius r | Distance d | Refractive Index nd | Abbe Number vd | Description |
|---|---|---|---|---|---|
| 0 | 0 | Infinity | | | |
| 1 | 1.072 | 0.506 | 1.54341 | 55.9 | first lens |
| 2 | 2.529 | 0.065 | | | |
| 3 | 0 | 0.651 | | | aperture |
| 4 | −0.830 | 0.412 | 1.54341 | 55.9 | second lens |
| 5 | −1.118 | 0.050 | | | |
| 6 | 1.628 | 0.816 | 1.53116 | 56.0 | third lens |
| 7 | 1.872 | 0.400 | | | |
| 8 | 0 | 0.210 | 1.51680 | 64.2 | filter |
| 9 | 0 | 0.607 | | | |

TABLE 5

| No. | k | α4 | α6 | α8 | α10 | α12 | α14 | α16 |
|---|---|---|---|---|---|---|---|---|
| 1 | −0.47307 | 5.16226E−02 | 1.97887E−01 | −2.10204E−01 | 4.52041E−01 | −1.41644E−01 | 0 | 0 |
| 2 | 9.79128 | 0.00000 | 0.00000 | 0.00000 | 0.00000 | 0.00000 | 0 | 0 |
| 4 | −7.74669 | −9.38623E−01 | 8.89877E−01 | −2.44424E+00 | 5.74004E+00 | −1.27314E+01 | 0 | 0 |
| 5 | −0.15744 | −2.29486E−02 | 6.41065E−02 | −4.95471E−02 | 3.84378E−03 | 1.02032E−01 | 0 | 0 |
| 6 | −28.11546 | −2.82480E−02 | 9.24407E−03 | −6.96632E−04 | −8.03718E−05 | 6.98355E−06 | 0 | 0 |
| 7 | −27.85998 | −3.66097E−02 | 1.15141E−03 | −5.33412E−04 | 1.55611E−04 | −2.03537E−05 | 0 | 0 |

Thus, the defocus-MTF curves of the imaging lens CL1 exhibit large peak shifting by wavelength (large chromatic aberration) resulting in a slightly low peak in the defocus-MTF curve of white light and therefore a slight reduction in image quality, as illustrated in FIG. 7D. However, the spread of the curve in the vicinity of the peak is wide, thus indicating a larger depth of focus.

The MTF peak of FIG. 7D is about 55% and satisfies the condition (2). Thus, the imaging lens CL1 can provide images sufficient for practical use. Moreover, the defocus range having MTF values of 20% or more is about 95 μm, satisfying the condition (3). Thus, the imaging lens CL1 is easy to focus and has good operability.

Second Exemplary Embodiment

The data defining lens elements of an imaging lens CL2 according to a second exemplary embodiment is presented in Table 4. The parameters defining a first lens L1 through a third lens L3 of the imaging lens CL2, i.e., a conic constant k and asphericity coefficients $\alpha_4$, $\alpha_6$, $\alpha_8$, $\alpha_{10}$, $\alpha_{12}$, $\alpha_{14}$, and $\alpha_{16}$, are presented in Table 5. The definitions of terms in Table 4 and Table 5 are the same as those in Table 2 and Table 3.

The F-number of the imaging lens CL2 is f/3.5, and the angle of view 2ω is 61.3°.

Figure 8A:
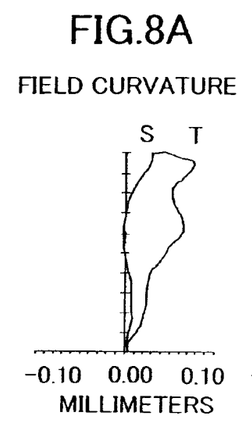
FIGS. 8A through 8D illustrate various aberrations of the imaging lens according to the second exemplary embodiment.
Figure 8B:
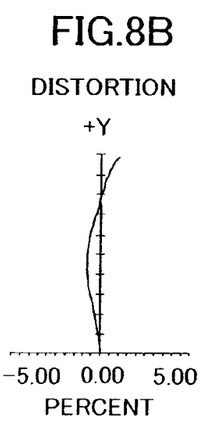
Figure 8C:
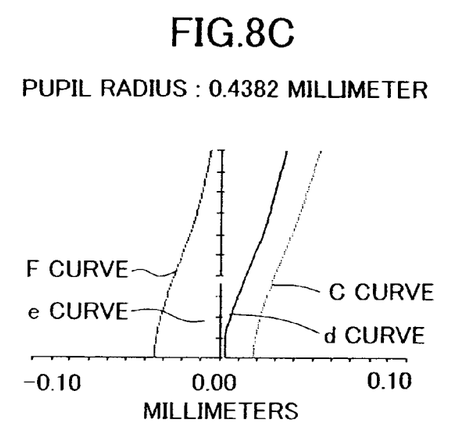
Figure 8D:
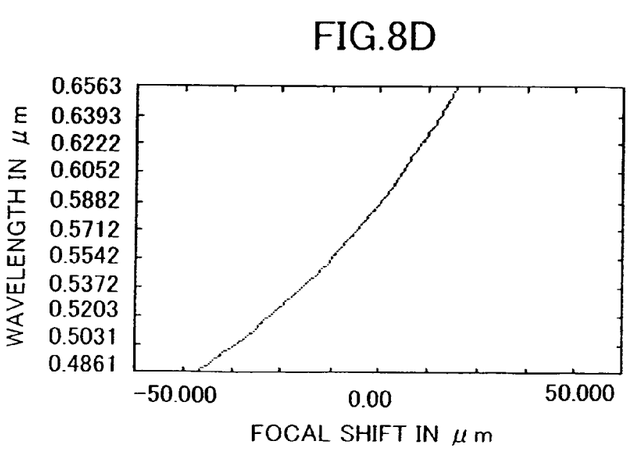

Aberrations of the imaging lens CL2 are illustrated in FIGS. 8A through 8D. FIG. 8A is a graph of astigmatism. FIG. 8B is a graph of distortion. FIG. 8C is a graph of spherical aberration. FIG. 8D is a graph of longitudinal chromatic aberration.

Third Exemplary Embodiment

The data defining lens elements of an imaging lens CL3 according to a third exemplary embodiment is presented in Table 6. The parameters defining a first lens L1 through a third lens L3 of the imaging lens CL3, i.e., a conic constant k and asphericity coefficients $\alpha_4$, $\alpha_6$, $\alpha_8$, $\alpha_{10}$, $\alpha_{12}$, $\alpha_{14}$, and $\alpha_{16}$, are presented in Table 7. The definitions of terms in Table 6 and Table 7 are the same as those in Table 2 and Table 3.

TABLE 6

| No. | Curvature Radius r | Distance d | Refractive Index nd | Abbe Number vd | Description |
|---|---|---|---|---|---|
| 0 | 0 | Infinity | | | |
| 1 | 1.335 | 0.429 | 1.53115 | 56.0 | first lens |

TABLE 6-continued

| No. | Curvature Radius r | Distance d | Refractive Index nd | Abbe Number vd | Description |
|---|---|---|---|---|---|
| 2 | 3.947 | 0.129 | | | |
| 3 | 0 | 0.737 | | | aperture |
| 4 | −0.702 | 0.473 | 1.53115 | 56.0 | second lens |
| 5 | −0.920 | 0.050 | | | |
| 6 | 1.632 | 1.023 | 1.53115 | 56.0 | third lens |
| 7 | 2.546 | 0.500 | | | |
| 8 | 0 | 0.210 | 1.51680 | 64.2 | filter |
| 9 | 0 | 0.565 | | | |

TABLE 7

| No. | k | α4 | α6 | α8 | α10 | α12 | α14 | α16 |
|---|---|---|---|---|---|---|---|---|
| 1 | −0.52211 | 2.45282E−02 | 1.70306E−01 | −4.73449E−01 | 7.41858E−01 | −3.47219E−01 | −4.00375E−01 | 3.60998E−01 |
| 2 | 9.09144 | 1.78437E−02 | −2.62438E−01 | 6.64424E−01 | 3.46278E−01 | −2.97301E+00 | −7.59624E+00 | 2.38338E+01 |
| 4 | −4.75149 | −1.20053E+00 | 1.23340E+00 | −2.25905E+00 | 1.47466E+00 | −6.48225E+00 | 2.27921E+01 | −1.88733E+01 |
| 5 | −0.16377 | −1.48131E−01 | 1.57088E−01 | −1.16820E−01 | 3.39325E−02 | 1.21762E−01 | 2.13211E−01 | 1.77965E−02 |
| 6 | −15.62343 | −1.69755E−02 | 1.21362E−02 | −1.47022E−03 | −2.51359E−04 | 3.19730E−05 | 1.66338E−05 | −2.97077E−06 |
| 7 | −11.67374 | −4.38638E−02 | 3.59186E−03 | 1.66906E−04 | 1.36203E−04 | −1.84141E−06 | −5.90977E−06 | 7.57500E−08 |

The F-number of the imaging lens CL3 is f/2.8, and the angle of view 2ω is 58.7°.

Figure 9A:
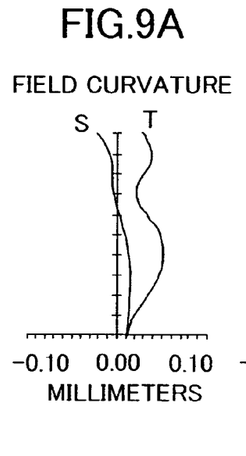
FIGS. 9A through 9D illustrate various aberrations of the imaging lens according to the third exemplary embodiment.
Figure 9B:
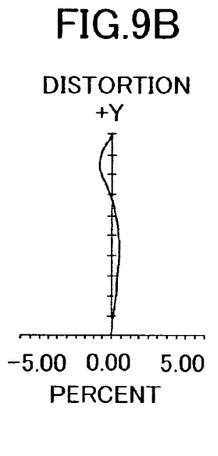
Figure 9C:
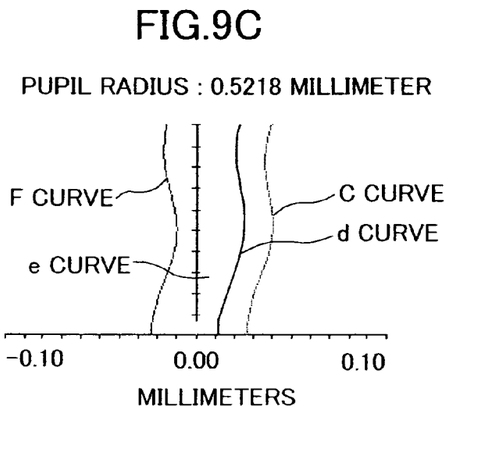
Figure 9D:
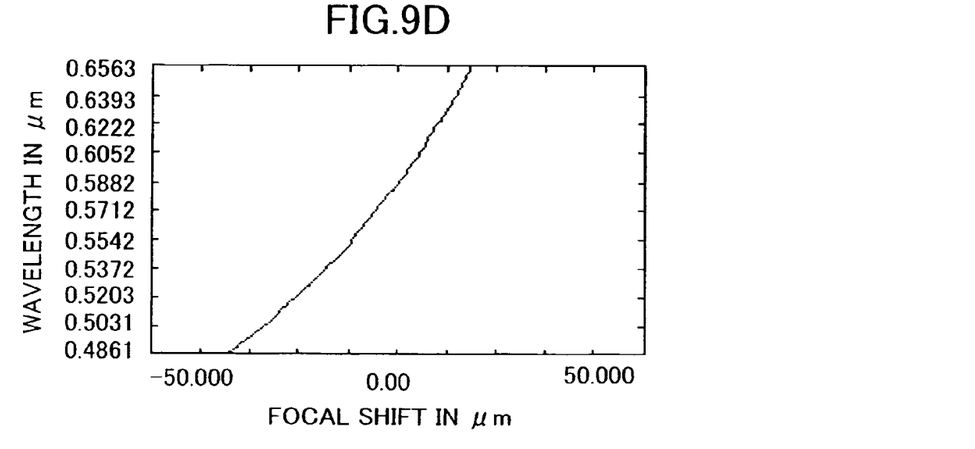

Aberrations of the imaging lens CL3 are illustrated in FIGS. 9A through 9D. FIG. 9A is a graph of astigmatism. FIG. 9B is a graph of distortion. FIG. 9C is a graph of spherical aberration. FIG. 9D is a graph of longitudinal chromatic aberration.

Fourth Exemplary Embodiment

The data defining lens elements of an imaging lens CL4 according to a fourth exemplary embodiment is presented in Table 8. The parameters defining a first lens L1 through a third lens L3 of the imaging lens CL4, i.e., a conic constant k and asphericity coefficients $\alpha_4$, $\alpha_6$, $\alpha_8$, $\alpha_{10}$, $\alpha_{12}$, $\alpha_{14}$, and $\alpha_{16}$, are presented in Table 9. The definitions of terms in Table 8 and Table 9 are the same as those in Table 2 and Table 3.

TABLE 8

| No. | Curvature Radius r | Distance d | Refractive Index nd | Abbe Number vd | Description |
|---|---|---|---|---|---|
| 0 | 0 | Infinity | | | |
| 1 | 1.315 | 0.566 | 1.53115 | 56.0 | first lens |
| 2 | 4.159 | 0.095 | | | |
| 3 | 0 | 0.696 | | | aperture |
| 4 | −0.686 | 0.513 | 1.53115 | 56.0 | second lens |
| 5 | −0.723 | 0.050 | | | |
| 6 | 3.247 | 0.928 | 1.53115 | 56.0 | third lens |
| 7 | 2.333 | 0.500 | | | |
| 8 | 0 | 0.210 | 1.51680 | 64.2 | filter |
| 9 | 0 | 0.584 | | | |

The F-number of the imaging lens CL4 is f/2.8, and the angle of view 2ω is 61.9°.

Figure 10A:
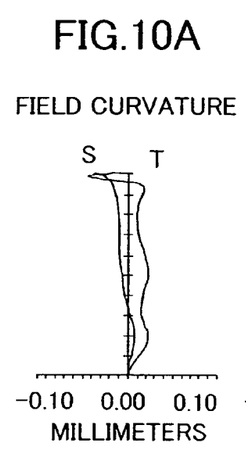
FIGS. 10A through 10D illustrate various aberrations of the imaging lens according to the fourth exemplary embodiment.
Figure 10B:
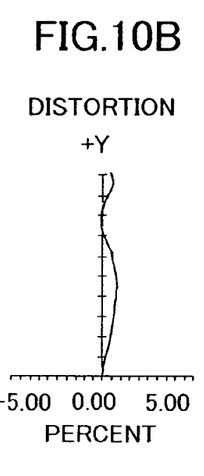
Figure 10C:
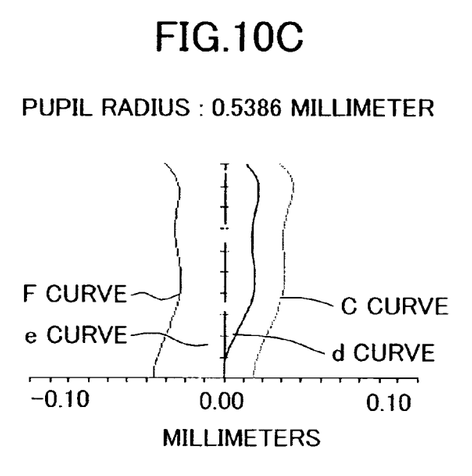
Figure 10D:
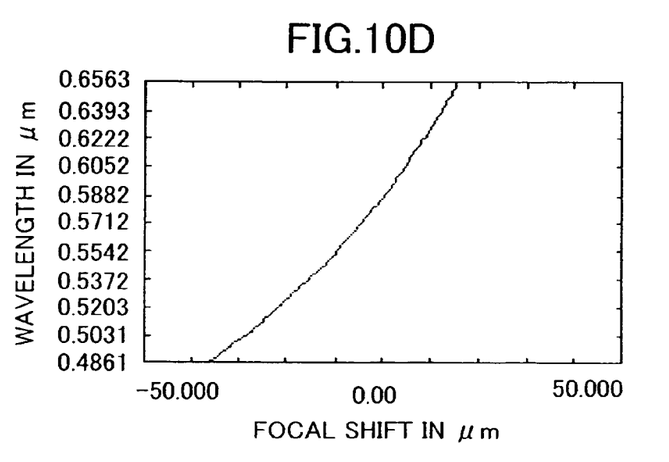

Aberrations of the imaging lens CL4 are illustrated in FIGS. 10A through 10D. FIG. 10A is a graph of astigmatism. FIG. 10B is a graph of distortion. FIG. 10C is a graph of spherical aberration. FIG. 10D is a graph of longitudinal chromatic aberration.

Comparison Example

Now, for comparison with the imaging lenses of the present invention, an imaging lens that does not satisfy the condition (1) is illustrated. Namely, the image quality and the operability of an imaging lens CL5 with a Δ/f value of 0.0141 are presented.

Figure 11A:
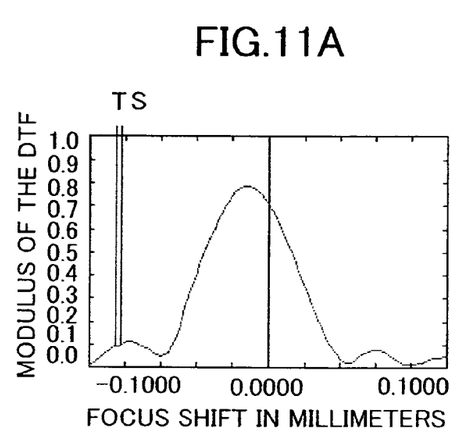
FIGS. 11A through 11D illustrate defocus-MTF curves for an imaging lens according to a comparative example having a Δ/f value of 0.0141.
Figure 11B:
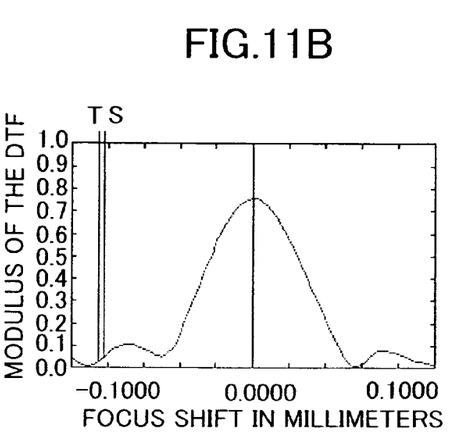
Figure 11C:
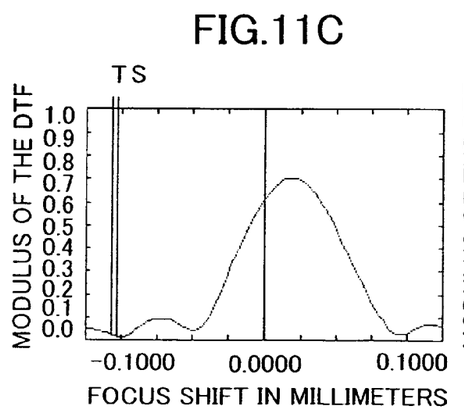
Figure 11D:
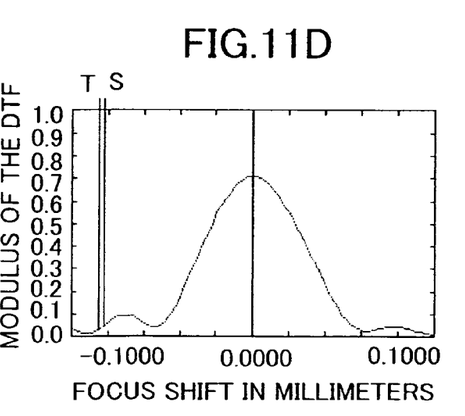

The defocus-MTF curves of the imaging lens CL5 illustrated in FIG. 11A through 11D are for a spatial frequency of 100 lp/mm. FIGS. 11A through 11C are graphs for single wavelengths at the F curve, the e curve, and the C curve, respectively. FIG. 11D is a graph for multiple wavelengths (white light) having wavelength weights of F curve:e curve:C curve=1:2:1.

Comparing FIG. 11A and FIG. 11B, the MTF peak at the F curve is shifted about 10 μm in the negative direction from the MTF peak at the e curve. Comparing FIG. 11B and FIG. 11C, the MTF peak at the C curve is shifted about 15 μm in the positive direction from the MTF peak at the e curve. Thus, the defocus-MTF curves of the imaging lens CL5 exhibit small shifting of peaks by wavelength, and therefore it can be said that chromatic aberration sufficiently has been corrected.

Thus, the peaks of the defocus-MTF curves of the imaging lens CL5 by wavelength exhibit small shifting, and therefore chromatic aberration is small. Likewise, FIG. 11D illustrates that the peak of the defocus-MTF curve is high for white light. However, the peak is narrow, and therefore the depth of focus is small.

Comparing FIG. 7D and FIG. 11D, the MTF peak of the imaging lens CL1 is slightly lower than that of the imaging lens CL5. The spread of the curve in the vicinity of the MTF peak of the imaging lens CL1 (defined as the region where

TABLE 9

| No. | k | α4 | α6 | α8 | α10 | α12 | α14 | α16 |
|---|---|---|---|---|---|---|---|---|
| 1 | −0.32230 | 1.96775E−02 | 9.90714E−02 | −3.56501E−01 | 6.49975E−01 | −4.60238E−01 | 0 | 0 |
| 2 | 47.04224 | −2.14170E−02 | −1.02912E+00 | 5.04442E+00 | −1.42512E+01 | 9.94358E+00 | 0 | 0 |
| 4 | −5.45474 | −1.91307E+00 | 2.98757E+00 | −4.41848E+00 | 9.07633E−01 | 5.20352E+00 | 0 | 0 |
| 5 | −0.46513 | −7.36992E−02 | 1.29980E−01 | 5.48171E−02 | 2.08850E−02 | 4.48967E−01 | 0 | 0 |
| 6 | −98.17551 | 8.94726E−03 | 4.85560E−03 | −2.55063E−03 | 4.07903E−04 | −3.48260E−05 | 0 | 0 |
| 7 | −18.87586 | −6.82898E−02 | 1.09872E−02 | −1.92053E−04 | −3.91709E−05 | −3.04238E−05 | 0 | 0 |

MTF values are 20% or more) is 4 to 10 µm wider than that of the imaging lens CL5. In other words, the imaging lenses of the present invention exhibit slightly poorer image quality even when precisely focused (albeit satisfying the required level), but have large depths of focus, and therefore are easy to focus.

As described above, the present invention provides for setting appropriate proportions between the focal distance and the chromatic aberration, thereby ensuring a sufficient depth of focus while maintaining predetermined levels of MTF peaks of the imaging lens. The resulting wider tolerance for focusing enables easy focusing during manufacture and easy focusing by an autofocus function. Furthermore, the system allows a larger manufacturing tolerance, permitting larger errors when mounting the lenses and more variation of part dimensions. In other words, a low sensitivity to manufacturing errors enables ease of manufacture.

The data defining the lens elements and shapes used in the imaging lenses CL1 through CL4 according to the first exemplary embodiment through the fourth exemplary embodiment, respectively, are merely illustrations. It is to be understood that other values satisfying the necessary conditions of the present invention may be used.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on and claims priority to Japanese Patent Application 2007-118436, filed on Apr. 27, 2007 and including specification, claims, drawings and summary. The disclosure of the above Japanese Patent Application is incorporated herein by reference in its entirety.

What is claimed is:

1. A compound imaging lens comprising:
  a first lens, a second lens, and a third lens disposed sequentially in this order, the first lens disposed toward an object, and the third lens disposed toward an image surface; wherein
  the first lens has a meniscus shape, a positive refraction, and a convex surface, the convex surface facing the object;
  the second lens has a meniscus shape and a concave surface, the concave surface facing the object;
  the third lens has a convex-type surface facing the object, and a concave-type aspherical surface facing the image surface, the concave-type aspherical surface configured to provide a negative refraction in a radially central portion and a positive refraction in a radially peripheral portion; and
  a condition $$0.016 < \Delta/f < 0.018 \tag{1}$$

is satisfied, where
    $\Delta$ is defined as an absolute value of longitudinal chromatic aberrations at Fraunhofer F curve and C curve wavelengths, and
    f is defined as a combined focal distance of the entire compound imaging lens.

2. The imaging lens according to claim 1, further comprising an aperture stop disposed between the first lens and the second lens.

* * * * *